Patented Dec. 14, 1948

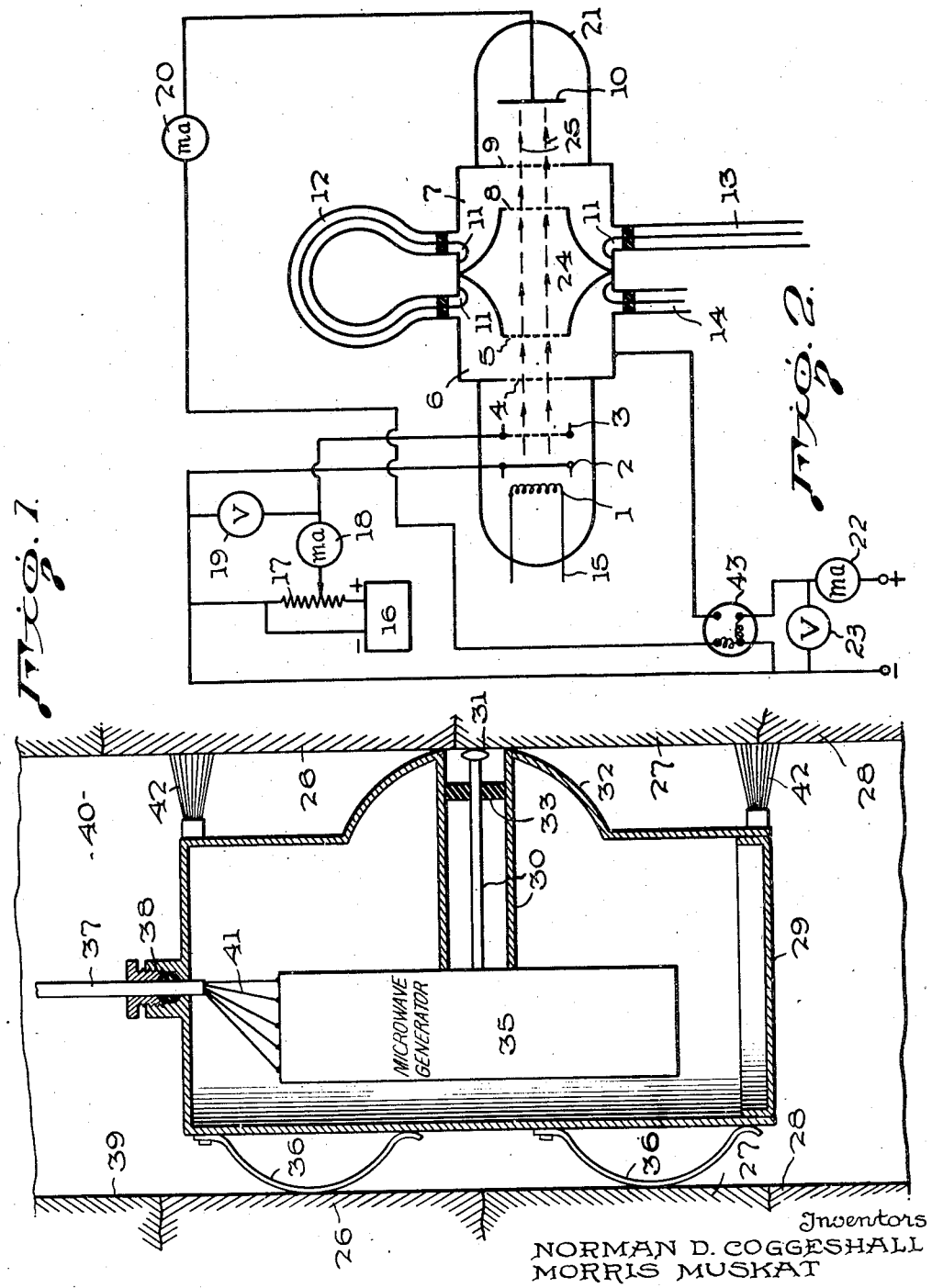

2,455,942

UNITED STATES PATENT OFFICE 2,455,942

GEOPHYSICAL EXPLORATION OF BOREHOLES BY MICROWAVES

Norman D. Coggeshall, O'Hara Township, Allegheny County, and Morris Muskat, Oakmont, Pa., assignors to Gulf Research & Development Company, Pittsburgh, Pa., a corporation of Delaware Application December 13, 1944, Serial No. 568,060

2 Claims. (Cl. 175—182)

This invention concerns a new and improved geophysical method of borehole logging and apparatus therefor and involving the use of microwaves. More particularly it is a method and apparatus by means of which geological formations adjacent to the borehole may be logged with regard to their microwave absorption properties.

In the art of geophysical prospecting, when applied to boreholes, the methods thus far developed have consisted of two classes of measurement. In the first, the rock strata traversed by the borehole have been subjected to various types of energy excitation, and diffusion or propagation of such excitation has been measured and recorded at points distant from the source. From these measurements, inferences are drawn, regarding the intervening medium. In the second class, streams of particles or radiation have been directed at the face of the borehole and the reaction of the strata has been taken as an indication of the nature of the strata at the location where the stream has impinged upon them.

In the former class, the methods of excitation have been mainly either of the electrical or acoustic type. That is, electrical fields of zero or low frequency have been imposed on the rock strata, while the diffusion and transmission of these fields have been measured at distant points. The absolute magnitudes or differential magnitudes of the fields at these points have been taken as an indication of the intervening medium. In a similar way, elastic or acoustic measurements of the exposed strata have been used to correlate or identify rock formations. Because of the relatively low frequency or long wave lengths of the excitation fields, the values observed at distant points have represented averages over large masses of intervening strata, thereby giving a rather low resolving power in the differentiation of such strata. Moreover, the problems of the coupling of the exciting sources to the rock strata, as well as of the detecting instruments, have created considerable uncertainty regarding the significance of the absolute values of the measurements.

In the second class of borehole investigation methods, the particle streams, such as those of neutrons, or extremely hard and short wave length electromagnetic radiations as γ rays, have provided the means for determining the characteristics of the exposed faces of rock strata. Such methods enjoy the advantage of providing measurements of the characteristics of rock strata at the region of incidence of the particle or radiation stream of small areal extent. The disadvantage of this type of measurement, however, is that it may be difficult to provide a sufficiently high intensity source of the particle stream, such as neutrons. The same is true with respect to wave streams such as those of γ rays. Moreover, the physical interpretation and meaning of the reactions of the rock strata to these particles or wave streams is rather obscure, and the correlation has to be largely empirical.

In the invention herein disclosed, a new method has been devised which obviates the disadvantages of the previously used techniques. It is of the type related to the second class described above, and comprises essentially the method of directing beams of microwaves against the rock strata and measuring or recording the degree of absorption of the incident beam. Microwaves comprise that class of electromagnetic waves whose wave length lies approximately between one meter and a fraction of a mm. From a physical point of view these possess many advantages over lower frequency electromagnetic waves, such as the radiowaves. While electromagnetic waves, as radio waves, or even those in the low frequency region can also be generated within well bores, they cannot be transmitted or directed in beams without the use of transmitting antennas having dimensions comparable to the wave length, and such dimensions are impossible to attain in a borehole. Because of their extremely short wave length microwaves can be excited and transmitted as directed beams, and the generating apparatus can be made of small dimensions. This question of apparatus dimensions is of significance, in that it permits their application in limited confines of well bores. On the other hand, microwaves have the same attributes and their interaction with matter is of the same type as of radiowaves. This feature does not obtain, in the case of γ rays. The similarity of microwaves to lower frequency electromagnetic radiation is of major importance with respect to the interpretation of the reaction of microwaves with the rock strata being explored. Thus, for example, both radio and microwaves are highly reflected by metallic or other conducting media. However, insulators provide easy transmission of microwaves and a beam directed into them will be absorbed or dissipated.

It is accordingly an object of this invention to provide a method and apparatus for borehole logging which is sensitive to electrical properties of the formations encountered.

Another object is to provide a method and apparatus for borehole logging which is sensitive to the surface or near surface characteristics of the formations.

Still another object is to provide a method and apparatus for borehole logging which makes use of microwaves in investigating the properties of the formations.

A still further object is to provide a method and apparatus for borehole logging which measures the microwave absorption properties of the formations.

Our invention is described in detail and will be best understood by reference to the accompanying drawings in which, Fig. 1 shows one assembly of the borehole logging apparatus suspended in a well; and Fig. 2 is a diagrammatic representation of one form of microwave generator which may be used.

In Fig. 1 we have shown a cross section of the earth, with borehole 40 and exposed face 39 of rock formations stratified as shown by 26, 27 and 28. Numeral 29 represents the external case of the microwave apparatus supported by cable 37 entering the apparatus by stuffing box and clamp 38. Cable 37 also supplies power to the apparatus through wires 41. Cable 37 is wound on a reel at the surface and there is provided conventional means for measuring the length of cable fed down into the hole or other means of determining the depth of unit 29. Also on the surface there may be conventional recording devices or control apparatus for other investigations simultaneously made in the well according to well known procedures.

The microwave generator is housed in 35 and the microwaves emanating from it follow wave guide 30 to the formation wall. Unit 30 may be either of coaxial cable extending from the microwave generator itself to the formation, or it may have the dimensions of a wave guide. The mode of excitation of unit 30 is such that it functions to feed microwave energy into the strata, that is, it electrically couples the formation medium tightly to the microwave generator 35.

If the formation has the properties of an electrical conductor it will act as a microwave reflector and no energy will enter the formation from wave guide 30. This will result in negligible loss of energy from the generator 35. On the other hand if the formation has the properties of an electrical insulator it will be transparent to microwaves and wave guide 30 will feed or radiate energy into the formation with resulting loss of energy from the generator 35. The generator 35 is so constructed that the power load equivalent of the rock strata reacts upon the generator in a measurable way. Such power load may be measured by measuring the net power output of the generator. Alternatively, the generator may be constructed so that variations in the power load will change its frequency of oscillation. By measuring the change in frequency the nature of the rock strata opposite the generator may be inferred. Unit 35 contains a microwave generator of a load sensitive type, plus other electrical equipment to permit obtaining an indication of the load.

One type of microwave generator which may be used in the above invention is called a Klystron. Its principal parts are shown diagrammatically in Fig. 2. Its principle of operation is discussed in a book by Brainerd et al. titled Ultra-High Frequency Techniques, page 330, et seq. This generator depends upon the electrodynamic resonance properties of closed or nearly closed metallic vessels. In Fig. 2, numeral 1 represents a heating filament which furnishes heat for a cathode 2 which emits electrons. Between the cathode 2 and grid 3 there is applied an accelerating voltage for the electrons. Thereupon the electrons travel to the grid 4 and practically all of them pass into and through the resonator space 6. It will be assumed that the generator is in operation, so that the electromagnetic oscillations exist in the resonator space 6. Depending upon the instantaneous phase of the oscillations there will be an electric field from 4 to 5 or from 5 to 4. Its action upon the electrons passing between grids 4 and 5 will be to speed them up or slow them down. This will result in their being bunched as they pass through the field free space 24.

The cavity space 7 is geometrically the same as 6, and therefore the resonant frequency of 7 will be same as for 6. Moreover, the electromagnetic resonators 6 and 7 are energetically coupled by the coaxial cable arrangement 12 which has an antenna 11 on each end. This allows either 6 to feed energy into 7 or vice versa. Therefore cavities 6 and 7 will both be in oscillation at once and at the same frequency. Consequently if the phase of the oscillations of resonator 7 is in proper relation to the phase of the bunches of electrons coming on paths 25, these electrons, by virtue of their kinetic energy, can either feed energy into 7 or absorb it from it. If they feed energy into 7 they will be slowed down; if not, they will be speeded up. Proper operating conditions, of course, are when they are slowed down to allow maximum energy transfer to the cavity resonator 7. The coaxial cable arrangement 13 allows energy in the form of microwaves to be drained off and utilized for whatever purpose is desired. In this case they are radiated onto the formation wall.

The coaxial cable arrangement 14 serves to preserve the symmetry of the two resonant cavities. After passing through grids 8 and 9, which are part of the resonator 7, the electrons pass into the anode 10 where they are collected. Numeral 21 represents the overall metal case of the generator and the leads to the various elements such as 1, 2, 3 and 10 enter the case through well-known insulating vacuum-tight bushings or glass seals not shown. The case 21 is customarily kept at ground potential while the cathode 2 and the anode 10 are at a high negative potential. Meter 20 measures the flow of electrons from the cathode 2 to the anode 10 and this current depends on the adjustment and state of oscillation of the tube and its load. Battery 16 is the voltage source for the first acceleration of electrons, and variable resistance 17 allows it to be controlled. Meter 18 measures that part of the emission from the cathode which is caught on grid 3, and 19 measures the voltage between 2 and 3. Voltmeter 23 measures the voltage applied to the electrons while between cathode 2 and grid 4, and meter 22 measures the flow of electrons from cathode 2 to the external case 21. Customary adjustment of a Klystron oscillator is such that some electrons leaving cathode 2 reach the anode 10. Even though the elements 2 and 10 are at substantially the same D.-C. potential, the instantaneous potentials acting on the electrons moving between the various elements when under conditions of oscillation as described above are such as to cause a current through meter 20, and for a particular adjustment this current is a maximum with no load on the oscillator. When microwave power is taken from the oscillator through coaxial cable 13, the reading of meter 20 will decrease and the reading of meter 22 will increase.

Referring again to Fig. 1, the case 29 is formed with a bumper flange 32 to keep the projecting wave guide 30 from getting caught in the well due to unevenness of the walls. The central conductor of 30 has a circular spring 31 attached to its end to maintain electrical contact with the strata regardless of their irregularities. An insulating bushing 33 serves to center the central conductor and its spring contact 31. Continuous contact between the guide 32 and the walls of the borehole is maintained by means of springs 36 which also permit the unit to adapt itself to variations in borehole diameter. Scrapers 42 clean off any mud cake which may have formed on the wall of the hole so that contacts 31 and 32 may contact the clean formation.

One method of practicing this invention consists of recording, as a correlation against depth, the amount of power transmitted into the strata by conductors 31 and 32, Fig. 1. A knowledge of this power output can be gained from the previously determined operating efficiency of the unit and from the instantaneous values of the operating parameters, such as the voltages and currents which may be measured by the meters shown in Fig. 2. For example, the power may be determined by readings of the voltmeter 23 and the current measuring meter 20. More conveniently these can be replaced by a single power measuring unit, such as a wattmeter 43. An example of such a wattmeter is a galvanometer of the well known dynamometer type in which the field coils are actuated by current set up by the voltage shown measured by 23 and the armature carries the current shown measured by 20. Such a galvanometer then has a resultant swing which is proportional to the product of the current and the voltage and which is a measure of power. As stated above, when microwave power is absorbed from the Klystron oscillator by the adjacent formation coupled thereto the current in meter 20 decreases thereby decreasing the deflection of wattmeter 43. The wattmeter 43 may be made to reflect a beam of light upon a moving photographic film in well known manner and arranged so that different amplitudes of swings would be correlated with position of the logging unit in the well by the method used by Fearon in Patent 2,309,835.

Broadly speaking, conducting beds, such as salt water strata, will have low absorption characteristics whereas non-conducting formations such as free gas zones, or strata saturated with oil, will allow the microwave energy to penetrate with resulting power absorption. Thus, a record of the variation of the absorption will provide not only a means of identifying rocks, but will also give an indication of the fluid content.

The invention and method herein disclosed may be operated at a frequency chosen so as to be appropriate to the average strata traversed by the well bore, or the measurement may be conducted in such a way as to study the variation of the absorbed energy with frequency. In particular, the frequency dispersion behavior of the rock formations may be used to indicate the nature of the strata. When granular media, such as rock strata, are irradiated by electromagnetic radiations of wave lengths comparable to the particle dimensions, pronounced anomalous absorption effects will take place. By observing the frequency of the incident radiation which gives rise to such resonance effects, the detailed structure and characteristics of the medium may be obtained. This type of exploration is to be included in the scope of invention. For such operation unit 35 in Fig. 1 may be conceived as a variable frequency generator. In general this generator will be of the cavity resonator type, although this invention is not to be limited to the use of such microwave equipment.

For the successful application of our invention any electrically conducting well drilling fluid must be removed from the borehole. Holes drilled by cable tool methods and which are dry are advantageously logged by our invention. Rotary drill holes may first be flushed or conditioned with fresh water or, more preferably, flushed with an electrically insulating oil base drilling fluid. The well fluid may enter the wave guide 30 since being non-conducting it will not interfere with its operation. Any conducting mud cake which would shield the formations must be removed from the walls of the hole as indicated by scrapers 42 in Fig. 1.

The invention is not to be construed as limited to the type of microwave generator herein set forth as this is merely illustrative. The frequency may be varied to suit geological conditions and the dimensions of the borehole.

What we claim is:

1. Borehole logging apparatus comprising a microwave generator, a tubular open-ended microwave guide coupled thereto, means for supporting said microwave guide so that its open end is directed substantially perpendicular to the axis of the borehole, means for urging an open end of said microwave guide substantially throughout its periphery against the wall of the borehole and means for measuring the power absorbed by the microwave generator.

2. Borehole logging apparatus comprising a microwave generator, a tubular open-ended microwave guide coupled thereto, said tubular microwave guide being of diameter less than half the diameter of the bore hole, means for supporting said microwave guide so that its open end is directed substantially perpendicular to the axis of the borehole, means for urging an open end of said microwave guide substantially throughout its periphery against the wall of the borehole and means for measuring the power absorbed by the microwave generator.

NORMAN D. COGGESHALL.
MORRIS MUSKAT.

REFERENCES CITED

The following references are of record in the file of this patent:

UNITED STATES PATENTS

| Number | Name | Date |
| --- | --- | --- |
| 2,075,808 | Fliess | Apr. 6, 1937 |
| 2,129,711 | Southworth | Sept. 13, 1938 |
| 2,129,712 | Southworth | Sept. 13, 1938 |
| 2,139,460 | Potapenko | Dec. 6, 1938 |
| 2,167,630 | Bazzoni | Aug. 1, 1939 |
| 2,253,589 | Southworth | Aug. 26, 1941 |
| 2,334,475 | Claudet | Nov. 16, 1943 |
| 2,343,531 | Buchholz | Mar. 7, 1944 |
| 2,346,481 | Garrison | Apr. 11, 1944 |

OTHER REFERENCES

"Geophysical Exploration," Hieland, page 627, pub. 1940 by Prentice Hall, Inc., New York city.